(12) United States Patent
Kim (10) Patent No.: US 8,984,026 B2
(45) Date of Patent: Mar. 17, 2015

(54) APPARATUS AND METHOD FOR GENERATING CONTEXT-AWARE INFORMATION USING LOCAL SERVICE INFORMATION

(75) Inventor: Su Myeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 13/156,137

(22) Filed: Jun. 8, 2011

(65) Prior Publication Data

US 2012/0066269 A1    Mar. 15, 2012

(30) Foreign Application Priority Data

Sep. 14, 2010    (KR) .................. 10-2010-0089912

(51) Int. Cl.
*G06F 17/30* (2006.01)

(52) U.S. Cl.
CPC .... *G06F 17/30595* (2013.01); *G06F 17/30864* (2013.01); *G06F 17/3087* (2013.01)
USPC ............................ 707/804; 707/736; 707/758

(58) Field of Classification Search
CPC ............ G06F 17/3087; G06F 17/3089; G06F 17/30893; G06F 15/16; G06F 17/30386; G06F 17/30867
USPC .......... 707/802, 804, E17.044, 736, 737, 758, 707/899; 705/6, 22, 44
See application file for complete search history.

(56) References Cited

U.S. PATENT DOCUMENTS

| | | | |
|---|---|---|---|
| 6,968,334 B2 * | 11/2005 | Salmenkaita et al. | 707/704 |
| 7,072,886 B2 * | 7/2006 | Salmenkaita et al. | 707/704 |
| 8,060,389 B2 * | 11/2011 | Johnson | 705/6 |
| 8,326,794 B1 * | 12/2012 | Wood et al. | 707/600 |
| 8,332,402 B2 * | 12/2012 | Forstall et al. | 707/736 |
| 8,495,105 B2 * | 7/2013 | Campbell et al. | 707/811 |
| 2003/0227392 A1 * | 12/2003 | Ebert et al. | 705/22 |
| 2004/0043758 A1 * | 3/2004 | Sorvari et al. | 455/414.1 |

FOREIGN PATENT DOCUMENTS

| | | |
|---|---|---|
| JP | 2002-117119 | 4/2002 |
| JP | 2002-188934 | 7/2002 |
| JP | 2002-247045 | 8/2002 |
| JP | 2002-288532 | 10/2002 |
| JP | 2003-006082 | 1/2003 |
| JP | 2004-295625 | 10/2004 |
| KR | 10-2010-0024676 | 3/2010 |

OTHER PUBLICATIONS

Duri, Sastry et al., "An Approach to Providing a Seamless End-User Experience for Location-Aware Applications", ACM 2001, pp. 20-25.*

* cited by examiner

*Primary Examiner* — Shahid Alam
(74) *Attorney, Agent, or Firm* — NSIP Law (57) ABSTRACT

An apparatus and method for generating context-aware information based on local service information are provided. In one embodiment, a hardware apparatus for generating context-aware information may include an information receiver configured to receive local service information from a local server; and a context-aware information generator configured to generate context-aware information associated with a user based on sensor information and the received local service information.

20 Claims, 6 Drawing Sheets

| Speed | Means of travel |
|---|---|
| < 4km/h | Walking |
| 4km/h~120km/h | Vehicle |
| 120km/h~300km/h | Express train |
| ⋮ | ⋮ |
| > 300km/h | Airplane |

420

| Speed | Attractions |
|---|---|
| ≈ 200km/h | Ride 1 |
| ≈ 100km/h | Ride 2 |
| ≈ 80km/h | Ride 3 |
| ⋮ | ⋮ |
| ≈ 6km/h | Ride n |

430

| Speed | Activity |
|---|---|
| < 4km/h | Walking |
| ≈ 200km/h | Ride 1 |
| ≈ 100km/h | Ride 2 |
| ⋮ | ⋮ |
| ≈ 6km/h | Ride n |

431 = Walking row
432 = Ride rows

| Decibel [dB] | Place |
|---|---|
| < 40dB | Quiet place |
| ≈ 50dB | Place to talk |
| > 60dB | Noisy place |

520

| Decibel [dB] | Place |
|---|---|
| < 30dB | Reading room |
| 30dB ~ 50dB | Break room |
| > 60dB | Outside library (abnormal situation) |

FIG. 6

APPARATUS AND METHOD FOR GENERATING CONTEXT-AWARE INFORMATION USING LOCAL SERVICE INFORMATION

CROSS-REFERENCE TO RELATED APPLICATION(S)

This application claims the benefit under 35 U.S.C. §119 (a) of Korean Patent Application No. 10-2010-0089912, filed on Sep. 14, 2010, in the Korean Intellectual Property Office, the entire disclosure of which is incorporated herein by reference for all purposes.

TECHNICAL FIELD

The following disclosure relates to a context-aware information generation apparatus and method, for example, to infer a context of a user.

BACKGROUND

A context-aware service may be configured to sense various contexts of a user and various contexts around the user, such as a location, a speed, and/or the like, and may infer a current context of the user based on the sensed various contexts to provide a useful service to the user. One conventional context-aware service may sense a location or a speed of the user, and may infer a context that the user is riding on a car, thereby providing information associated with a rest area or a gas station close to the user or providing information associated with traffic.

However, context-aware services may have difficulties in accurately predicting the context of the user. Accordingly, it may be difficult to apply context-aware services to "real world" situations due to inaccuracy in predicting the context of the user.

SUMMARY

According to an aspect, a hardware apparatus for generating context-aware information may include an information receiver configured to receive local service information from a local server; and a context-aware information generator configured to generate context-aware information associated with a user based on sensor information and the received local service information.

According to an aspect, the context-aware information generator may include a service information generating unit configured to generate new service information based on basic service information and the received local service information.

According to an aspect, wherein the context-aware information generator may further include a context inferring unit configured to infer a context of the user based on the new service information and the sensor information; and an information providing unit configured to provide the context-aware information associated with the user, the context-aware information being used to describe the inferred context of the user.

According to an aspect, the apparatus may further include an information deleting unit configured to delete the new service information when a local service provided by the local server is terminated.

According to an aspect, context-aware information generator may be configured to generate the context-aware information associated with the user based on basic service information and the sensor information when a local service is terminated.

According to an aspect, the local service information may be defined as an element corresponding to the sensor information based on a local service provided by the local server, and the context-aware information generator may be configured to generate the context-aware information associated with the user based on the element corresponding to the sensor information.

According to an aspect, the sensor information comprises may include one or more of: location information, speed information, illumination information, noise level information, weather information, traffic information or a combination thereof, and the context-aware information generator may be configured to generate the context-aware information associated with the user based on local service information corresponding to the sensor information.

According to an aspect, that apparatus may further include a sensor information receiver configured to receive the sensor information measured using a sensor.

According to an aspect, the sensor information receiver may be configured to receive the sensor information from the sensor via a network connection.

According to an aspect, the local server may be located in a predetermined area where the context-aware information generation apparatus is located.

According to an aspect, the apparatus may be moveable relative to the local server such that the apparatus moves into and/or out of a coverage range of the local server.

According to an aspect, a method of generating context-aware information using a hardware apparatus may include: receiving local service information from a local server; and generating context-aware information associated with a user using sensor information and the received local service information.

According to an aspect, the generating may include generating new service information based on basic service information and the received local service information.

According to an aspect, the generating may further include inferring a context of the user based on the new service information and the sensor information; and providing the context-aware information associated with the user, the context-aware information being used to describe the inferred context of the user.

According to an aspect, the method may further include deleting the new service information when a local service provided by the local server is terminated.

According to an aspect, the generating may include generating the context-aware information associated with the user based on basic service information and the sensor information when a local service is terminated.

According to an aspect, the local service information may be defined as an element corresponding to the sensor information based on a local service provided by the local server, and the generating may include generating the context-aware information associated with the user based on the element corresponding to the sensor information.

According to an aspect, the sensor information may include one or more of: location information, speed information, illumination information, noise information, weather information, traffic information or a combination thereof, and the generating may include generating the context-aware information associated with the user based on local service information corresponding to the sensor information.

According to an aspect, the method may further include receiving the sensor information measured using a sensor.

According to an aspect, the sensor information may be received from the sensor via a network connection.

According to an aspect, the local service information may be related to an area where a context-aware information generation apparatus is located.

According to an aspect, the apparatus may be moveable relative to the local server such that the apparatus moves into and/or out of a coverage range of the local server.

According to an aspect, the method may further include providing a service or service information to the user based on the generated context-aware information.

According to an aspect, a non-transitory computer-readable medium has computer-readable instructions that when executed by a processor configured to implement a method of generating context-aware information. The method may include receiving local service information from a local server; and generating context-aware information associated with a user using sensor information and the received local service information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Context-aware information generation apparatuses and methods are described herein which generate context-aware information. Subsequently, a context-aware service or service information can be provided to a user based at least on part on the generated context-aware information, in some implementations. Services provided to users, may include, for example, telecommunication services, medical services, business services, recreation, travel and leisure services, food and dining services, commuter or traveler services, child or pet care services, shopping services, or other services which be useful for a person. And service information provided to one or more users may include informational materials, warnings, advertisements (e.g., targeted materials, coupons, cost/price/rate information, etc.), directions, social media links, Internet or web links, and/or the like.

According to various embodiments, context-aware information associated with a user may be generated by receiving local service information and generating the context-aware information based on sensor information and the received service local information. The sensor information may be contextual information related to a user. For example, one or more sensors may measure or otherwise sense information regarding one or more contexts of a user and/or contexts around the user. Sensor measurements may be made in real-time and/or received at various times, as necessary, in various implementations. And in some embodiments, new service information may be generated which is subsequently used for context-aware information generation so as to adapt to change depending on a movement of the user with respect to a service, server provider, and/or service coverage area.

As used herein, "local service information" may refer to information associated with and/or specialized depending on a service provided by the local server. The local service information may be related to an area where a context-aware information generation apparatus is located, in various embodiments. In one example, described herein, a service provider may an amusement or theme park, and the local service information includes data related to different attractions (e.g., rides) at an amusement or theme park and corresponding speeds. And, in another example, described herein, a service provider may be a library and the local service information includes data relates to a library building and corresponding noise levels therein. Of course, it will be appreciated that local service information may vary for different services and/or service providers and that the examples discussed herein are not to be construed as limiting.

Moreover, as used herein, "basic service information" may refer to or describe contexts frequently or typically found in a person's daily life. In one example, described herein, basic service information may include data concerning a means of travel of a user (i.e., by walking, vehicle, train, airplane, etc.) and corresponding speeds. And, in another example, described herein, the basic service information may include data related to user-perceived noise of a location or place and corresponding noise levels. Of course, it will be appreciated that the basic service information may vary for different persons and/or demographic groups (e.g., age, gender, occupation, etc.) and that the examples discussed herein are not to be construed as limiting.

And, as used herein, "new service information" may refer to updated or modified service information based on local service information, basic service information or both, and/or charges thereto. The various types of information and data described herein may be electronically stored in a memory device and/or electronically transmitted (e.g., via a network), in various embodiments.

Figure 1:
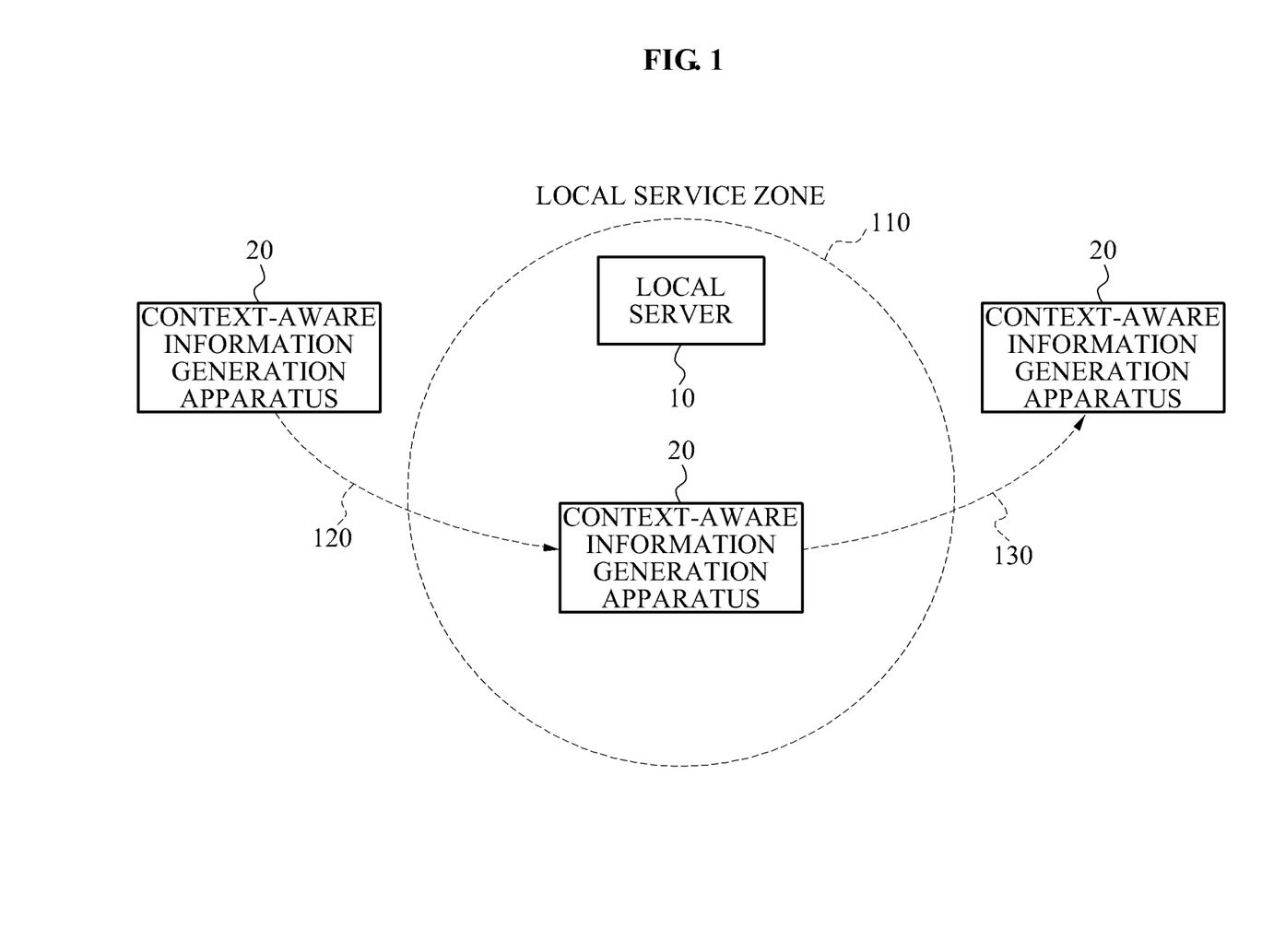
FIG. 1 is a diagram illustrating operation of a context-aware information generation apparatus for inferring a context of a user.

FIG. 1 illustrates operation of a context-aware information generation apparatus 20 configured to infer a context of a user.

Referring to FIG. 1, when the context-aware information generation apparatus 20 moves inside a local service zone 110, as indicated by an arrow 120, the context-aware information generation apparatus 20 may receive local service information from a local server 10. As discussed above, the local service information may vary depending on a local service provided. The local service zone 110 may be defined as the coverage range of the local server 10. In various embodiments, the local service zone 110 may be a wireless network, such as, for example, cellular, 802.xx (e.g., WiFi or WiMax) and/or the like, although wired networks may also be possible in some implementations. While the local service zone 110 is depicted as being generally circular in FIG. 1, it should be appreciated that local service zone may have other shapes depending on geography/terrain, weather conditions, interference, desired coverage, number of and overlap of network access points or base stations, and/or the like.

Additionally, the context-aware information generation apparatus 20 may be configured to generate new service information based on the received local service information from the local server 10. In one embodiment, the context-aware information generation apparatus 20 may be configured to infer a context of a user based on the new service information, and may generate context-aware information associated with the user.

For example, when the context-aware information generation apparatus 20 moves outside the local service zone 110, as indicated by an arrow 130 of FIG. 1, context-aware information associated with the user may be generated based on basic service information that is stored in advance. In various implementations, the context-aware information generation apparatus 20 may be configured as a portable terminal, such as, for example, a mobile phone, a smart phone, a personal digital assistance (PDA), a Digital Multimedia Broadcasting (DMB) phone, a netbook or notebook computer, or the like.

Additionally, when the context-aware information generation apparatus 20 moves outside the local service zone 110, as indicated by the arrow 130, the local server 10 may terminate the local service provided to the context-aware information generation apparatus 20. Accordingly, the context-aware information generation apparatus 20 may be configured to delete or remove the new service information, and may generate context-aware information associated with the user based on the basic service information.

Figure 2:
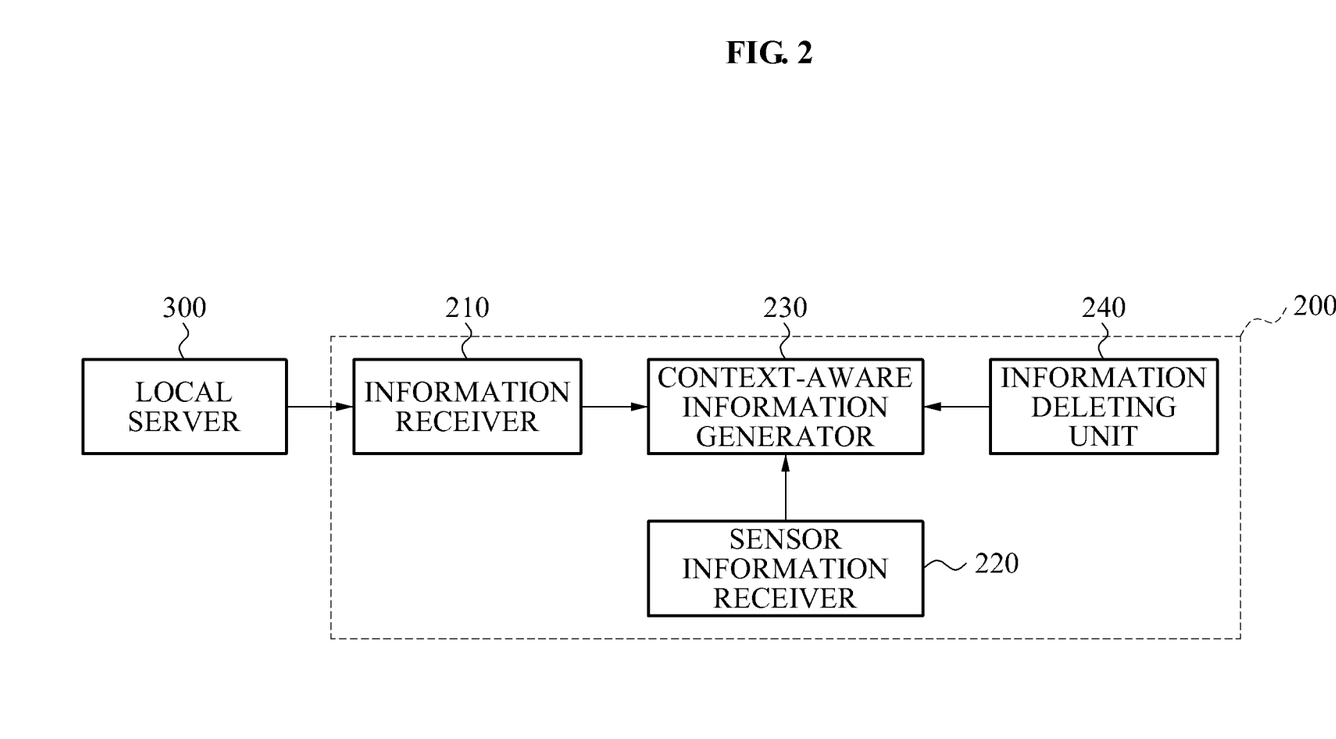
FIG. 2 is a block diagram illustrating a configuration of a context-aware information generation apparatus.

FIG. 2 illustrates a configuration of a context-aware information generation apparatus 200.

Referring to FIG. 2, the context-aware information generation apparatus 200 may include an information receiver 210, a sensor information receiver 220, a context-aware information generator 230, and an information deleting unit 240.

When the context-aware information generation apparatus 200 moves inside a local service zone, the information receiver 210 may receive local service information from a local server 300. The local server 300 may be, for instance, a server or other computing device for providing local service information that is associated with and/or specialized to a predetermined area. The local server 300 may be operated by a local server provider or third party who provides one or more services to uses in local service zone 110. For example, the local service may be provided within a predetermined area, such as a campus of a university, a theme park, a department store, a library, a hospital, an office, airport, train station, or the like.

Additionally, the local service information may be information defined as an element corresponding to sensor information based on a local service provided by the local server 300. The sensor information may include internal sensor information sensed by an internal sensor built into the context-aware information generation apparatus 200, and external sensor information that is sensed by an external sensor and received via a network, such as, for example, the Internet. In various embodiments, the network may be a wireless network, although wired networks may also be possible.

Figure 4:
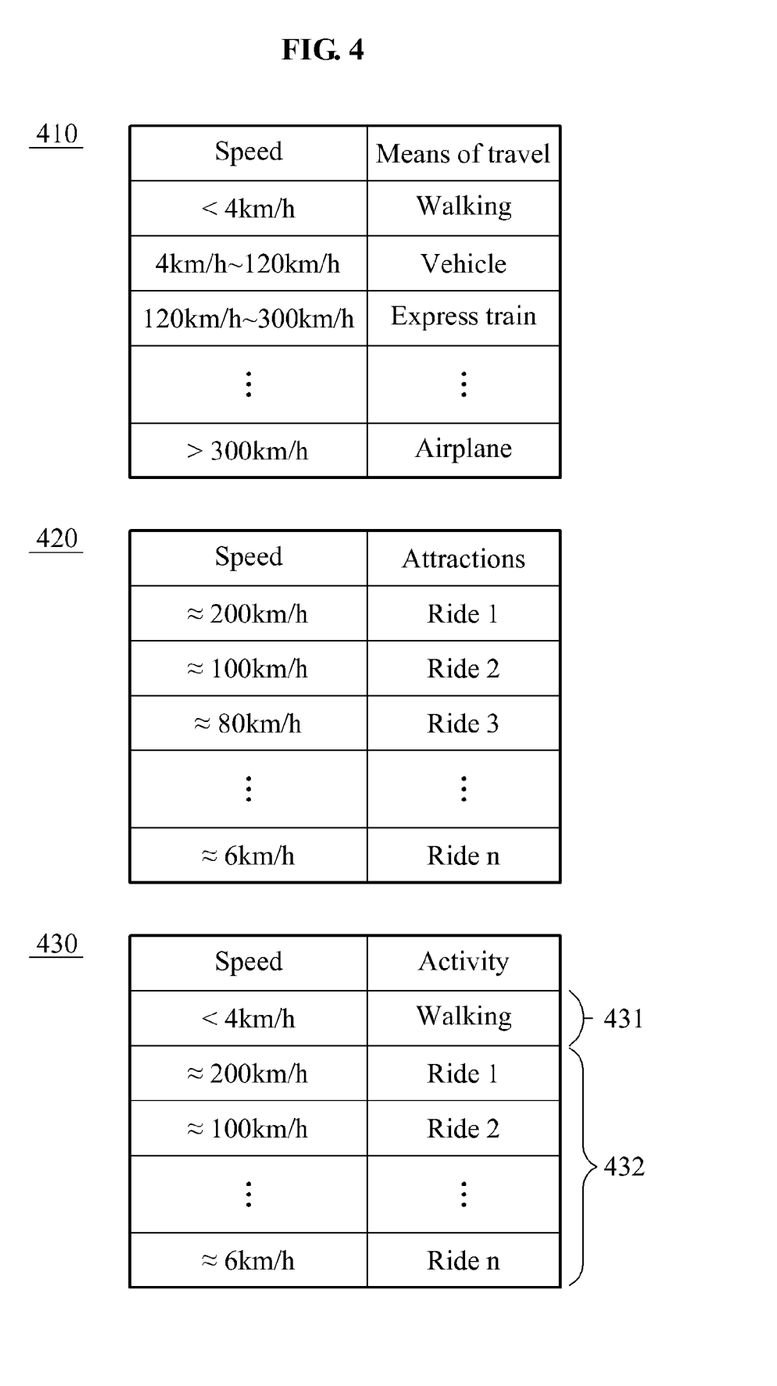
FIGS. 4 and 5 are diagrams illustrating examples generating new service information based on local service information.

In an example in which the local server 300 is located in a theme park, local service information 420 provided by the local server 300 may include speed (velocity) information and attraction information, as illustrated in FIG. 4.

Figure 5:
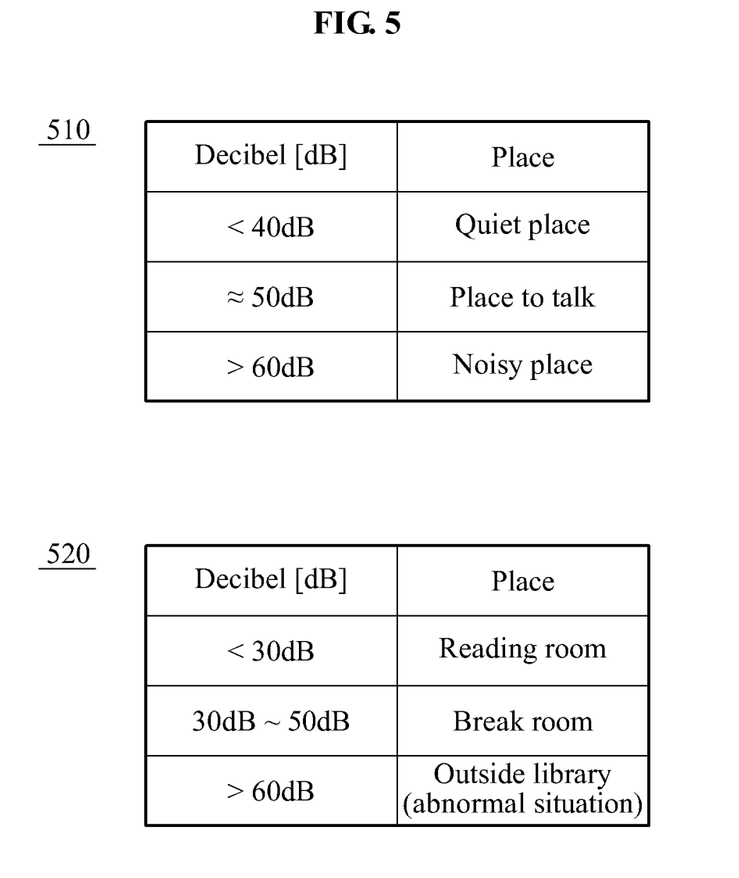

In another example in which the local server 300 is located in a library, local service information 520 provided by the local server 300 may be include noise level information (e.g., decibel (dB)) and place or location information, as illustrated in FIG. 5.

The sensor information receiver 220 may be configured to receive the internal sensor information sensed by the internal sensor built in the context-aware information generation apparatus 200. For example, a sensor may include an illumination sensor, sound level sensor, an acceleration/force sensor, a speed (velocity) sensor, a displacement sensor, a gyro sensor, a Global Positioning System (GPS) and/or other sensing technologies, related to a desired user context. Accordingly, in one or more embodiments, the sensor information may include at least one of speed information, noise level information, location information, or illumination information, for instance. Of course, it should be appreciated that the internal sensor information may include other sensed context-aware information, as desired.

Additionally, the sensor information receiver 220 may be configured to receive the external sensor information sensed by the external sensor, via a network (e.g. the Internet), or the like. The external sensor information may include weather information and/or traffic information, in some implementations. For example, the sensor information receiver 220 may be configured to receive external sensor information from a webpage of a meteorological office or from a webpage of a traffic information center. Of course, it should be appreciated that the external sensor information may include other sensed or retrieved information, as desired.

The context-aware information generator 230 may be configured to generate context-aware information associated with a user based on local service information and sensor information. Additionally, the context-aware information generator 230 may be configured to generate new service information based on the local service information and basic service information that is stored in advance. The basic service information may be used to describe contexts frequently used in people's daily life, and may be associated with sensor information and an element corresponding to the sensor information.

The context-aware information generator 230 may also be configured to generate context-aware information associated with a user based on the new service information and sensor information. For example, in some implementations, a user may be able to physically carry the context-aware information generation apparatus 200. Although, it will be appreciated that the context-aware information generation apparatus 200 may be located on movable entities associated with a person, such as, for example, a vehicle (e.g., on a car, boat, airplane, motorcycle, bicycle, scooter, etc.), or an animal (e.g., a seeing-eye dog or horse).

One exemplary operation of generating context-aware information associated with a user will be further described with reference to FIG. 3 below.

The information deleting unit 240 may be configured to delete or remove the new service information when the local service is terminated. When a local service is terminated in response to a request of a user, the information deleting unit 240 may delete new service information. In another example in which the context-aware information generation apparatus 200 moves outside a local service zone, and then a local service is terminated, the information deleting unit 240 may delete new service information Additionally, when new service information is generated by the context-aware information generator 230, the information deleting unit 240 may delete, the local service information received from the local server 300. In one or more implementations, the information deleting unit 240 may delete or otherwise remove the local service information from a database associated with the context-aware information generation apparatus 200.

As described above, when the local service is terminated, the context-aware information generator 230 may be configured to generate the context-aware information associated with the user based on the basic service information and sensor information.

Figure 3:
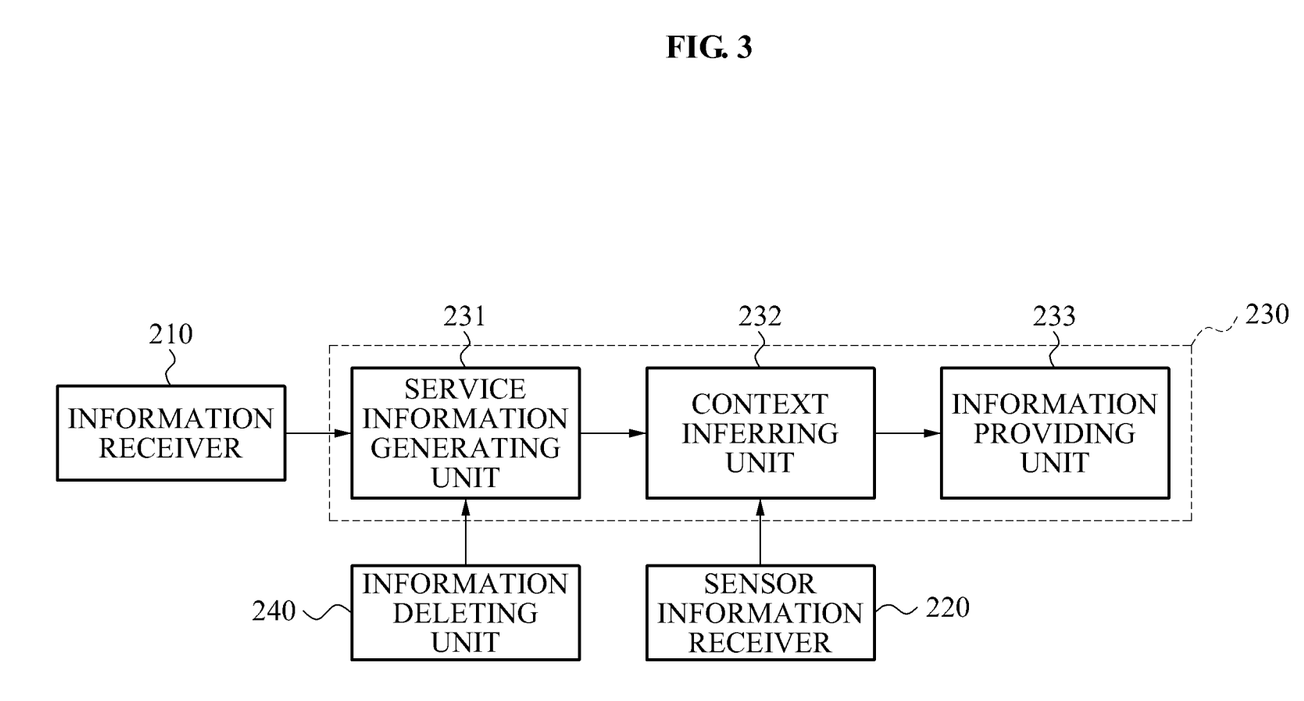
FIG. 3 is a block diagram illustrating one example of the context-ware information generator of the context-aware information generation apparatus illustrated in FIG. 2.

FIG. 3 illustrates one example of the context-aware information generator 230 illustrated in FIG. 2.

As shown in FIG. 3, the context-aware information generator 230 may include a service information generating unit 231, a context inferring unit 232, and an information providing unit 233.

The service information generating unit 231 may be configured to generate new service information based on the local service information received from the local server 300, and/or the basic service information. The basic service information may be stored in a memory, in advance, in various implementations. For example, when the new service information is generated, the information deleting unit 240 may delete from a database associated with the context-aware information generation apparatus 200 the local service information received from the local server 300.

The context-aware information generation apparatus 200 may be located, for example, in a theme park, the service information generating unit 231 may generate new service information 430 by combining basic service information 410 with the local service information 420, as illustrated in FIG. 4. Accordingly, the new service information 430 may be configured with information 431 contained in the basic service information 410, and information 432 contained in the local service information 420.

In another example, the context-aware information generation apparatus 200 may be located in a library, in which the service information generating unit 231 may generate new service information by substituting or replacing basic service information 510 with local service information 520 as illustrated in FIG. 5. The generated new service information may indicate the local service information 520.

The context inferring unit 232 may be configured to infer a context of a user. The context of the user may be based on new service information and sensor information, in various embodiments. For example, the context inferring unit 232 may extract an element corresponding to the sensor information from the new service information. Additionally, the context inferring unit 232 may infer a context of a user carrying the context-aware information generation apparatus 200 based on the extracted element.

In an example in which the context-aware information generation apparatus 200 is located in a theme park, and sensor information indicates a speed of 100 km/h, the context inferring unit 232 may extract information on 'Ride 2' as an element corresponding to 100 km/h from the new service information 430, as illustrated in FIG. 4. In this example, ride information in the new service information 430 may act as an element corresponding to sensor information. Additionally, the context inferring unit 232 may infer that a user is riding on Ride 2, based on the extracted information on the 'Ride 2'.

Subsequently, the information providing unit 233 may be configured to generate context-aware information associated with the user that is used to describe the inferred context of the user. For example, the information providing unit 233 may generate context-aware information associated with the user indicating 'the user is experiencing Ride 2' or 'the user is experiencing an attraction'. Additionally, the information providing unit 233 may provide the user with the generated context-aware information by displaying the generated context-aware information on a display device of the context-aware information generation apparatus 200.

In another example in which the context-aware information generation apparatus 200 is located in a library, and sensor information indicates a noise level of 29 dB, the context inferring unit 232 may extract information on 'Reading room' as an element corresponding to 29 dB from the new service information, namely the local service information 520, as illustrated in FIG. 5. In this example, the place information in the local service information 520 may act as an element corresponding to sensor information. Additionally, the context inferring unit 232 may infer that a user is located in the reading room, based on the extracted information on the 'Reading room'.

Subsequently, the information providing unit 233 may be configured to generate context-aware information associated with the user that is used to describe the inferred context of the user. For example, the information providing unit 233 may generate context-aware information associated with the user indicating 'the user is located in the Reading room' or 'the user is reading in the Reading room'. Additionally, the information providing unit 233 may provide the user, service provider and/or a third-party with the generated context-aware information.

The context inferring unit 232 may be configured to also infer a context of a user based on basic service information and/or sensor information.

For example, when the context-aware information generation apparatus 200 moves outside a local service zone, or when a local service is terminated (e.g., in response to a request of a user), the context inferring unit 232 may infer a context of the user based on basic service information and sensor information. For example, when a local service is terminated, the information deleting unit 240 may delete new service information from a database associated with the context-aware information generation apparatus 200. Referring to FIG. 4, when sensor information indicates a speed of 100 km/h, the context inferring unit 232 may extract information on 'Vehicle' as an element corresponding to 100 km/h from the basic service information 410. Additionally, the context inferring unit 232 may infer that the user is riding on a vehicle, based on the extracted information on the 'Vehicle'.

Subsequently, the information providing unit 233 may generate context-aware information associated with the user that is used to describe the inferred context of the user. For example, the information providing unit 233 may generate context-aware information associated with the user indicating 'the user is moving in a Vehicle' or 'the user rides in a Vehicle'. Additionally, the information providing unit 233 may provide the user with the generated context-aware information.

As described above, it may be possible to more accurately infer a context of a user depending on whether the context-aware information generation apparatus 200 is located within or outside the local service zone. In various embodiments, the context-aware information generation apparatus 200 may be carried by or otherwise associated with the user.

Figure 6:
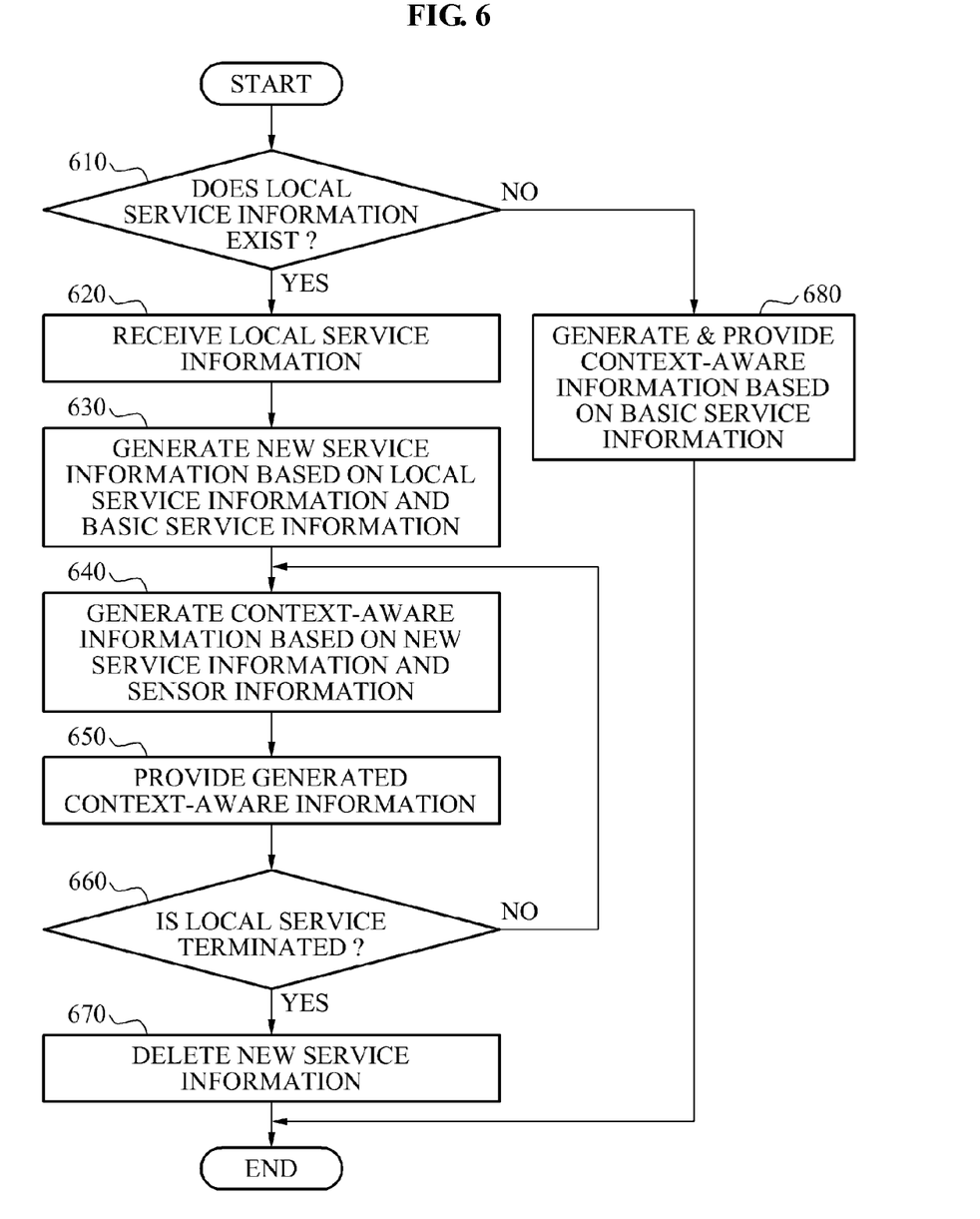
FIG. 6 is a flowchart illustrating one example of an operation of the context-aware information generation apparatus illustrated in FIG. 2.

FIG. 6 illustrates one exemplary operation of the context-aware information generation apparatus 200 illustrated in FIG. 2.

In operation 610, the context-aware information generation apparatus 200 determines whether local service information exists in the local server 300 of an area where the context-aware information generation apparatus 200 is located. If the result of the determination is "YES", in operation 620, the information receiver 210 may receive the local service information from the local server 300. For instance, the local server 300 may be a server for providing a local service that is associated with and/or specialized to a predetermined area. Additionally, the local service information may be information defined as an element corresponding to sensor information based on a local service provided by the local server 300.

In operation 630, the service information generating unit 231 may generate new service information, based on the received local service information and basic service information that is stored in advance. For instance, when generation of the new service information is completed, the information deleting unit 240 may delete the local service information from the database associated with the context-aware information generation apparatus 200. Additionally, the service information generating unit 231 may generate new service information by combining the local service information with the basic service information, and/or by substituting or replacing the basic service information with the local service information. As discussed above, the basic service information may be used to describe contexts frequently used in people's daily life, and may be configured with sensor information and an element corresponding to the sensor information.

In an example in which the sensor information includes speed information, the basic service information 410 may be configured with information on means of travel that corresponds to the speed information, as illustrated in FIG. 4. In this example, the new service information 430 generated by combining the local service information with the basic service information may include the information 431 among the basic service information 410, and the information 432 among the local service information.

In another example in which the sensor information includes noise information, the basic service information 510 may be configured with information on places corresponding to decibels, as illustrated in FIG. 5. In this example, the basic service information 510 may be substituted or replaced with the local service information 520 and thus, the local service information 520 may be used as new service information.

In operation 640, the context inferring unit 232 may infer a context of a user based on the new service information and/or sensor information, and the information providing unit 233 may generate context-aware information associated with the user based on the inferred context of the user. The sensor information may include internal sensor information and/or external sensor information. The internal sensor information may include, for example, speed information, noise level information, location information, and illumination information and/or the like. Additionally, the external sensor information may include at least one of weather information and traffic information.

The context inferring unit 232 may be configured to extract, from the new service information, an element corresponding to received sensor information. Additionally, the context inferring unit 232 may infer the context of the user based on the extracted element. Subsequently, the information providing unit 233 may generate context-aware information associated with the user that is used to describe the inferred context of the user.

In operation 650, the information providing unit 233 may provide the user with the generated context-aware information. For example, the information providing unit 233 may provide the user with the generated context-aware information through one or more input/output (I/O) devices, such as, a display device and/or a speaker of the context-aware information generation apparatus 200. The I/O devices may be incorporated into (e.g., "built into") the context-aware information generation apparatus 200, for instance.

In operation 660, a determination is made whether a local service is terminated. If the result of the determination is "YES," the information deleting unit 240 may delete the new service information in operation 670. Otherwise, if the result of the determination is "NO," the process continues to operation 680, as discussed below.

In an example in which the context-aware information generation apparatus 200 moves outside the local service zone, a local service provided by the local server 300 may be terminated.

In another example in which a user requests a termination of a local service via the context-aware information generation apparatus 200, the local service may be terminated. The local service might also be terminated in response to a termination request of the user, even when the context-aware information generation apparatus 200 is located within the local service zone, for instance. When the local service is terminated, the information deleting unit 240 may then delete new service information.

Additionally, when the local service is terminated, the context inferring unit 232 may infer the context of the user based on basic service information and/or sensor information.

When the result of the determination is "NO" in operation 660, the context inferring unit 232 may return to operation 640 to continue to infer the context of the user based on the new service information and the continuously received sensor information. Subsequently, the information providing unit 233 may generate the context-aware information associated with the user based on the inferred context of the user. On the other hand, when the result of the determination is "YES," in operation 660, the process proceeds to operation 670.

Similarly, when the local service information does not exist in the local server 300 in operation 610, the context-aware information generator 230 may generate context-aware information associated with the user, based on the basic service information stored in advance (in a memory) and the sensor information received from the sensor information receiver 220, and may provide the generated context-aware information in operation 680.

Accordingly, the context inferring unit 232 may infer different contexts of the user depending on whether the context-aware information generation apparatus 200 is located within or outside the local service zone. For example, when the context-aware information generation apparatus 200 is located in a theme park, and when the sensor information indicates a speed of 100 km/h, the context inferring unit 232 may infer that the user is experiencing the Ride 2. However, when only the basic service information is used (e.g., due to termination of the local service), and when the sensor information indicates a speed of 100 km/h, the context inferring unit 232 may infer that the user is moving in the vehicle. As such, the context inferring unit 232 may infer different contexts of the user using both the local service information and the basic service information, or using only the basic service information. Accordingly, the accuracy in inferring the context of the user may be improved.

While operations of inferring the context of the user using speed information or noise information as sensor information have been described above, it will be appreciated that these sensed phenomenon are merely exemplary. Accordingly, the context inferring unit 232 may infer the context of the user based on at least one of a plurality of pieces of internal sensor information and/or a plurality of pieces of external sensor information. For example, the context inferring unit 232 may infer that 'the user is riding on a vehicle in an express highway with smooth flow of traffic', based on traffic information, location information, and speed information.

According to one or more embodiments, it may be possible to improve a quality of context-awareness of a user by more accurately predicting a context of the user. Additionally, it may be possible to generate context-aware information associated with a user that is adaptively applicable to "real world" situations even when surroundings around the user change depending on a movement of the user.

One or more embodiments may be recorded, stored, or fixed in one or more non-transitory computer-readable media that includes program instructions to be implemented by a computer to cause a processor to execute, implement or perform the program instructions. The media may also include, alone or in combination with the program instructions, data files, data structures, or the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hardware apparatus for generating context-aware information, the apparatus comprising:
    an information receiver configured to receive local service information from a local server; and
    a context-aware information generator configured to generate context-aware information associated with activities of a user based on sensor information and the received local service information,
    wherein the context-aware information generator comprises:
        a service information generating unit configured to generate new service information based on basic service information that is stored in advance and the received local service information; and
        a context inferring unit configured to infer a context associated with activities of the user based on the new service information and the sensor information,
    wherein the context-aware information generator is configured to generate the context-aware information associated with activities of the user based on basic service information and the sensor information when a local service is terminated.

2. The apparatus of claim 1, wherein the context-aware information generator further comprises:
    an information providing unit configured to provide the context-aware information associated with activities of the user, the context-aware information being used to describe the inferred context associated with activities of the user.

3. The apparatus of claim 1, further comprising:
    an information deleting unit configured to delete the new service information when a local service provided by the local server is terminated.

4. The apparatus of claim 1, wherein the local service information is defined as an element corresponding to the sensor information based on a local service provided by the local server, and
    wherein the context-aware information generator is configured to generate the context-aware information associated with activities of the user based on the element corresponding to the sensor information.

5. The apparatus of claim 1, wherein the sensor information comprises one or more of: speed information, illumination information, noise level information, weather information, traffic information or a combination thereof, and
    wherein the context-aware information generator is configured to generate the context-aware information associated with activities of the user based on local service information corresponding to the sensor information.

6. The apparatus of claim 1, further comprising:
    a sensor information receiver configured to receive the sensor information measured using a sensor.

7. The apparatus of claim 6, wherein the sensor information receiver is configured to receive the sensor information from the sensor via a network connection.

8. The apparatus of claim 1, wherein the local server is located in a predetermined area where the context-aware information generation apparatus is located.

9. The apparatus of claim 1, wherein the apparatus is moveable relative to the local server such that the apparatus moves into and/or out of a coverage range of the local server.

10. A method of generating context-aware information using a hardware apparatus, the method comprising:
    receiving local service information from a local server; and
    generating context-aware information associated with activities of a user using sensor information and the received local service information,
    wherein the generating comprises generating new service information based on basic service information that is stored in advance and the received local service information,
    wherein the generating comprises inferring a context associated with activities of the user based on the new service information and the sensor information, and
    wherein the generating comprises generating the context-aware information associated with activities of the user based on basic service information and the sensor information when a local service is terminated.

11. The method of claim 10, wherein the generating further comprises:
    providing the context-aware information associated with activities of the user, the context-aware information being used to describe the inferred context associated with activities of the user.

12. The method of claim 10, further comprising:
    deleting the new service information when a local service provided by the local server is terminated.

13. The method of claim 10, wherein the local service information is defined as an element corresponding to the sensor information based on a local service provided by the local server, and wherein the generating comprises generating the context-aware information associated with activities of the user based on the element corresponding to the sensor information.

14. The method of claim 10, wherein the sensor information comprises one or more of: speed information, illumination information, noise information, weather information, traffic information or a combination thereof, and wherein the generating comprises generating the context-aware information associated with activities of the user based on local service information corresponding to the sensor information.

15. The method of claim 10, further comprising:

receiving the sensor information measured using a sensor.

16. The method of claim 15, wherein the sensor information is received from the sensor via a network connection.

17. The method of claim 10, wherein the local service information is related to an area where a context-aware information generation apparatus is located.

18. The method of claim 10, wherein the apparatus is moveable relative to the local server such that the apparatus moves into and/or out of a coverage range of the local server.

19. The method of claim 10, further comprising:

providing a service or service information to the user based on the generated context-aware information.

20. A non-transitory computer-readable medium having computer-readable instructions that when executed by a processor configured to implement a method of generating context-aware information, the method comprising:

receiving local service information from a local server; and generating context-aware information associated with activities of a user using sensor information and the received local service information, wherein the generating comprises generating new service information based on basic service information that is stored in advance and the received local service information, wherein the generating comprises inferring a context of associated with activities the user based on the new service information and the sensor information, and wherein the generating comprises generating the context-aware information associated with activities of the user based on basic service information and the sensor information when a local service is terminated.

* * * * *